(12) United States Patent
Yang

(10) Patent No.: US 9,659,291 B2
(45) Date of Patent: May 23, 2017

(54) METHOD FOR PROCESSING A PAYMENT

(71) Applicant: Chien-Kang Yang, Taipei (TW)

(72) Inventor: Chien-Kang Yang, Taipei (TW)

( * ) Notice: Subject to any disclaimer, the term of this patent is extended or adjusted under 35 U.S.C. 154(b) by 136 days.

(21) Appl. No.: 14/295,661

(22) Filed: Jun. 4, 2014

(65) Prior Publication Data
US 2014/0289121 A1   Sep. 25, 2014

Related U.S. Application Data

(63) Continuation-in-part of application No. 13/402,838, filed on Feb. 22, 2012, now abandoned.

(30) Foreign Application Priority Data

May 4, 2011   (TW) .............................. 100115595 A
Sep. 11, 2013   (TW) .............................. 102132767 A

(51) Int. Cl.
G06Q 40/00  (2012.01)
G06Q 40/02  (2012.01)
G06Q 20/34  (2012.01)
G06Q 20/12  (2012.01)
G06Q 20/32  (2012.01)
G06Q 20/38  (2012.01)
G06Q 20/42  (2012.01)

(52) U.S. Cl.
CPC ........... G06Q 20/353 (2013.01); G06Q 20/12 (2013.01); G06Q 20/325 (2013.01); G06Q 20/3226 (2013.01); G06Q 20/38 (2013.01); G06Q 20/382 (2013.01); G06Q 20/42 (2013.01)

(58) Field of Classification Search
CPC ............................... G06Q 40/00; G06Q 40/02

USPC .......................................................... 705/44
See application file for complete search history.

(56) References Cited

U.S. PATENT DOCUMENTS 5,386,106 A   1/1995   Kumar
6,705,520 B1  3/2004   Pitroda et al.
6,769,607 B1  8/2004   Pitroda et al.
(Continued)

FOREIGN PATENT DOCUMENTS

CN   102867255 A   1/2013
CN   102867374 A   1/2013
(Continued)

OTHER PUBLICATIONS

Search Report dated Oct. 14, 2015 for Taiwanese Patent Application No. 100115595.
(Continued)

Primary Examiner — Sara C Hamilton
(74) Attorney, Agent, or Firm — The Mueller Law Office, P.C.

(57) ABSTRACT

In a method for processing a payment, an electronic device receives transaction information related to a transaction and to a payment for the transaction, accesses a payment card via a portable payment device, cooperates with the payment card to generate a payment command to include at least the transaction information, establishes a session with a banking server, and transmits the payment command to the banking server under the session. The banking server identifies validity of the payment card based on the payment command, and processes the payment according to the transaction information afterward. The electronic device then receives a payment result generated by the banking server after completing the payment.

8 Claims, 9 Drawing Sheets

(56) References Cited

U.S. PATENT DOCUMENTS

| | | |
|---|---|---|
| 7,309,012 B2 | 12/2007 | Von Mueller et al. |
| 7,374,079 B2 | 5/2008 | Nam et al. |
| 7,581,678 B2 | 9/2009 | Narendra et al. |
| 7,828,214 B2 | 11/2010 | Narendra et al. |
| 7,954,715 B2 | 6/2011 | Narendra et al. |
| 7,954,716 B2 | 6/2011 | Narendra et al. |
| 7,954,717 B2 | 6/2011 | Narendra et al. |
| 8,083,145 B2 | 12/2011 | Narendra et al. |
| 8,091,786 B2 | 1/2012 | Narendra et al. |
| 8,127,999 B2 | 3/2012 | Diamond |
| 8,136,732 B2 | 3/2012 | Narendra et al. |
| 8,151,345 B1 | 4/2012 | Yeager |
| 8,235,287 B2 | 8/2012 | Mckelvey |
| 8,281,998 B2 | 10/2012 | Tang et al. |
| 8,286,875 B2 | 10/2012 | Tang et al. |
| 8,302,860 B2 | 11/2012 | Mckelvey |
| 8,406,809 B2 | 3/2013 | Florek et al. |
| 8,408,463 B2 | 4/2013 | Narendra et al. |
| 2002/0025796 A1 | 2/2002 | Taylor et al. |
| 2002/0123965 A1 | 9/2002 | Phillips |
| 2004/0058705 A1 | 3/2004 | Morgan et al. |
| 2004/0077372 A1 | 4/2004 | Halpern |
| 2004/0087339 A1 | 5/2004 | Goldthwaite et al. |
| 2005/0109841 A1 | 5/2005 | Ryan et al. |
| 2005/0247787 A1 | 11/2005 | Von Mueller et al. |
| 2006/0122902 A1 | 6/2006 | Petrov et al. |
| 2006/0186209 A1 | 8/2006 | Narendra et al. |
| 2006/0226217 A1 | 10/2006 | Narendra et al. |
| 2007/0057038 A1 | 3/2007 | Gannon |
| 2007/0244811 A1 | 10/2007 | Tumminaro |
| 2007/0251997 A1 | 11/2007 | Brown et al. |
| 2007/0288371 A1 | 12/2007 | Johnson |
| 2009/0069049 A1 | 3/2009 | Jain |
| 2009/0095812 A1 | 4/2009 | Brown et al. |
| 2009/0134218 A1 | 5/2009 | Yuzon et al. |
| 2009/0298540 A1 | 12/2009 | Narendra et al. |
| 2010/0030651 A1 | 2/2010 | Matotek et al. |
| 2010/0057620 A1 | 3/2010 | Li et al. |
| 2010/0063893 A1 | 3/2010 | Townsend |
| 2010/0243732 A1 | 9/2010 | Wallner |
| 2011/0022482 A1 | 1/2011 | Florek et al. |
| 2011/0053560 A1 | 3/2011 | Jain et al. |
| 2011/0053644 A1 | 3/2011 | Narendra et al. |
| 2011/0073663 A1 | 3/2011 | Narendra et al. |
| 2011/0073665 A1 | 3/2011 | Narendra et al. |
| 2011/0077052 A1 | 3/2011 | Narendra et al. |
| 2011/0078081 A1 | 3/2011 | Pirzadeh et al. |
| 2011/0084140 A1 | 4/2011 | Wen |
| 2011/0112968 A1 | 5/2011 | Florek et al. |
| 2011/0177852 A1 | 7/2011 | Jain et al. |
| 2011/0220726 A1 | 9/2011 | Narendra et al. |
| 2011/0223972 A1 | 9/2011 | Narendra et al. |
| 2011/0263292 A1 | 10/2011 | Phillips |
| 2011/0269438 A1 | 11/2011 | Narendra et al. |
| 2011/0272468 A1 | 11/2011 | Narendra et al. |
| 2011/0272469 A1 | 11/2011 | Narendra et al. |
| 2011/0290874 A1 | 12/2011 | Tang et al. |
| 2012/0055989 A1 | 3/2012 | Tang et al. |
| 2012/0061467 A1 | 3/2012 | Tang et al. |
| 2012/0067964 A1 | 3/2012 | Narendra et al. |
| 2012/0095867 A1 | 4/2012 | Mckelvey |
| 2012/0095868 A1 | 4/2012 | Mckelvey |
| 2012/0095869 A1 | 4/2012 | Mckelvey |
| 2012/0095870 A1 | 4/2012 | Mckelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095915 A1 | 4/2012 | Mckelvey |
| 2012/0095916 A1 | 4/2012 | Dorsey et al. |
| 2012/0129452 A1 | 5/2012 | Koh et al. |
| 2012/0138675 A1 | 6/2012 | Narendra et al. |
| 2012/0166295 A1 | 6/2012 | Loevenguth et al. |
| 2012/0173423 A1 | 7/2012 | Burdett et al. |
| 2012/0191556 A1 | 7/2012 | Forbes et al. |
| 2012/0191613 A1 | 7/2012 | Forbes et al. |
| 2012/0253974 A1 | 10/2012 | Haikonen et al. |
| 2012/0270528 A1 | 10/2012 | Goodman |

FOREIGN PATENT DOCUMENTS

| | | |
|---|---|---|
| EP | 1213691 A2 | 6/2002 |
| EP | 2182457 A | 5/2010 |
| GB | 2492614 A | 1/2013 |
| JP | 2003-296649 A | 10/2003 |
| JP | 2003-346062 A | 12/2003 |
| TW | 200919354 A | 5/2009 |
| TW | 201015497 A | 4/2010 |
| WO | 0143087 A1 | 6/2001 |
| WO | 2010032216 A1 | 3/2010 |
| WO | 2010128442 A2 | 11/2010 |

OTHER PUBLICATIONS

European Search Report dated Feb. 27, 2015 from European Application No. 14184138.7.
European Search Report dated Sep. 7, 2012 for European Patent Application No. 12166532.7.
Search Report in an Office Action dated Mar. 29, 2016 for Chinese Counterpart Application No. 201410001966.7.

| order details | | | | | | | |
|---|---|---|---|---|---|---|---|
| order number | 40609954 | | | transaction status | | | |
| cellphone | 09361219 | | | identification number | | A22***21 | |
| telephone | | | | email | | | |
| ticket type | date | train No. | From | To | departure | arrival | Fare | Seat |
| outbound | 7/5 | 203 | Taipei | TaoYuan | 13:30 | 13:49 | TWD 160 | Car5-1A |
| Car | Business Car | Passangers: Adult 1 | | | Passangers: Adult 1 | | |
| | | | Total: TWD 160 | | | | |

Payment/Ticket Collect

Pay Online  HSR Stations  T-Express cellphone
Ticketing Info  Ticketing Info  purchase system Pay Online Pay now!

Pay using your portable payment device portable payment device

Home

Pay online

FIG. 4

Payment using portable payment device-Web version

Please confirm that your portable payment device in inserted into the USB slot

Confirm  Cancel

F I G. 5

Payment using portable payment device-Web version
Invoice

Cancel

XX bank Credit card 1 selected

HSR invoice

| X card virtual account | 0101******2290 |
| --- | --- |
| Merchant No. | T00400 |
| Terminal No. | 23321252 |
| Date | 40609954 |
| Amount | NT$160 |

Please input your access password for X card (6-12 digits)

| 5 | 4 | 2 |
| --- | --- | --- |
| 8 | 1 | 7 |
| 9 | 6 | 3 |
| 0 | Clear | confirm |

F I G. 6

METHOD FOR PROCESSING A PAYMENT

CROSS-REFERENCE TO RELATED APPLICATION

This application is a continuation-in-part of U.S. patent application Ser. No. 13/402,838, filed on Feb. 22, 2012, which claims priority of Taiwanese Application No. 100115595, filed on May 4, 2011. This application further claims priority of Taiwanese Application No. 102132767, filed on Sep. 11, 2013.

BACKGROUND OF THE INVENTION

1. Field of the Invention

The invention relates to a method for processing a payment, more particularly to a method that employs a plug-and-play device for processing a payment.

2. Description of the Related Art

Currently, payments for goods and/or services may be done using cash or plastic money cards (e.g., a credit card, a debit card, etc.). In order to accept plastic money cards as a means for payment, a merchant must enter an agreement with a card issuer (e.g., a bank) and provide a processing equipment (e.g., a card reader capable of reading the payment card) for communicating with the card issuer. As a result, merchants operating with low revenue and/or profit margin may be discouraged to accept plastic money cards.

As for online transactions, an online payment using a credit card is generally executed on a personal computer or a mobile device (e.g., a smart phone). When executing the online payment, a user is first instructed to enter personal information via an interface (e.g., a webpage displayed on the personal computer) including a username and an associated password for verifying the identity of the user. After identity of the user is verified, the interface further instructs the user to enter credit card information, which may include a card number, an expiration date, etc. A conventional system for executing such payment is disclosed in Taiwanese Patent Application Publication No. 473681.

However, in cases where the computer and the mobile device are not available or are not functional (due to reasons such as no Internet connection or insufficient power), an online transaction may be unable to take place.

SUMMARY OF THE INVENTION

Therefore, the object of the present invention is to provide a method that is capable of addressing the drawbacks of the prior arts mentioned above.

Accordingly, a method of the present invention is for processing a payment. The method is to be implemented using an electronic device that is removably connected to a portable payment device and that communicates with a banking server. The portable payment device is a plug-and-play device and is provided with a payment card. The method comprises:

(a) receiving, by the electronic device, transaction information related to a transaction and to a payment for the transaction;

(b) accessing, by the electronic device, the payment card via the portable payment device;

(c) cooperating, by the electronic device, with the payment card to generate a payment command to include at least the transaction information;

(d) establishing, by the electronic device, a session with the banking server, the session providing a secure communication channel between the electronic device and the banking server;

(e) transmitting, by the electronic device, the payment command to the banking server under the session established in step (d), the banking server being configured to identify validity of the payment card based on the payment command in response to receipt of the payment command and to process the payment according to the transaction information included in the payment command after identifying the payment card as valid; and (f) receiving, by the electronic device, a payment result from the banking server under the session established in step (d), the payment result being generated by the banking server after completing the payment.

Another object of the present invention is to provide a system that is configured to communicate with a banking server to perform the aforementioned method.

Accordingly, a system of the present invention includes an electronic device and a portable payment device.

The electronic device includes a processor, a memory unit that is coupled to the processor and that stores a transaction application therein, a first connecting interface that is coupled to the processor, and a communication unit that is coupled to the processor and that is configured to communicate with a banking server.

The portable payment device is a plug-and-play device, and is to be removably connected to the electronic device. The portable payment device includes a card slot that is provided with a card interface for containing a payment card therein, and a second connecting interface that is to be electrically connected to the first connecting interface of the electronic device, thereby enabling access of the payment card using the electronic device.

The transaction application, when executed by the processor, causes the electronic device to cooperate with the payment card and the banking server to execute a method as described above.

Another object of the present invention is to provide an electronic device that is able perform the method.

Accordingly, an electronic device of the present invention includes a processor, a memory unit that is coupled to the processor and that stores a transaction application therein, a first connecting interface that is coupled to the processor and that is for removably coupling to a portable payment device provided with a payment card, and a communication unit that is coupled to the processor and that is configured to communicate with a banking server.

The transaction application, when executed by the processor, causes the electronic device to cooperate with the payment card and the banking server to execute a method as described above.

BRIEF DESCRIPTION OF THE DRAWINGS

Other features and advantages of the present invention will become apparent in the following detailed description of the preferred embodiment with reference to the accompanying drawings, of which:

FIGS. 4 to 7 illustrate various messages outputted by an input/output unit of the electronic device in different stages of the method.

DETAILED DESCRIPTION OF THE PREFERRED EMBODIMENT

Figure 1:
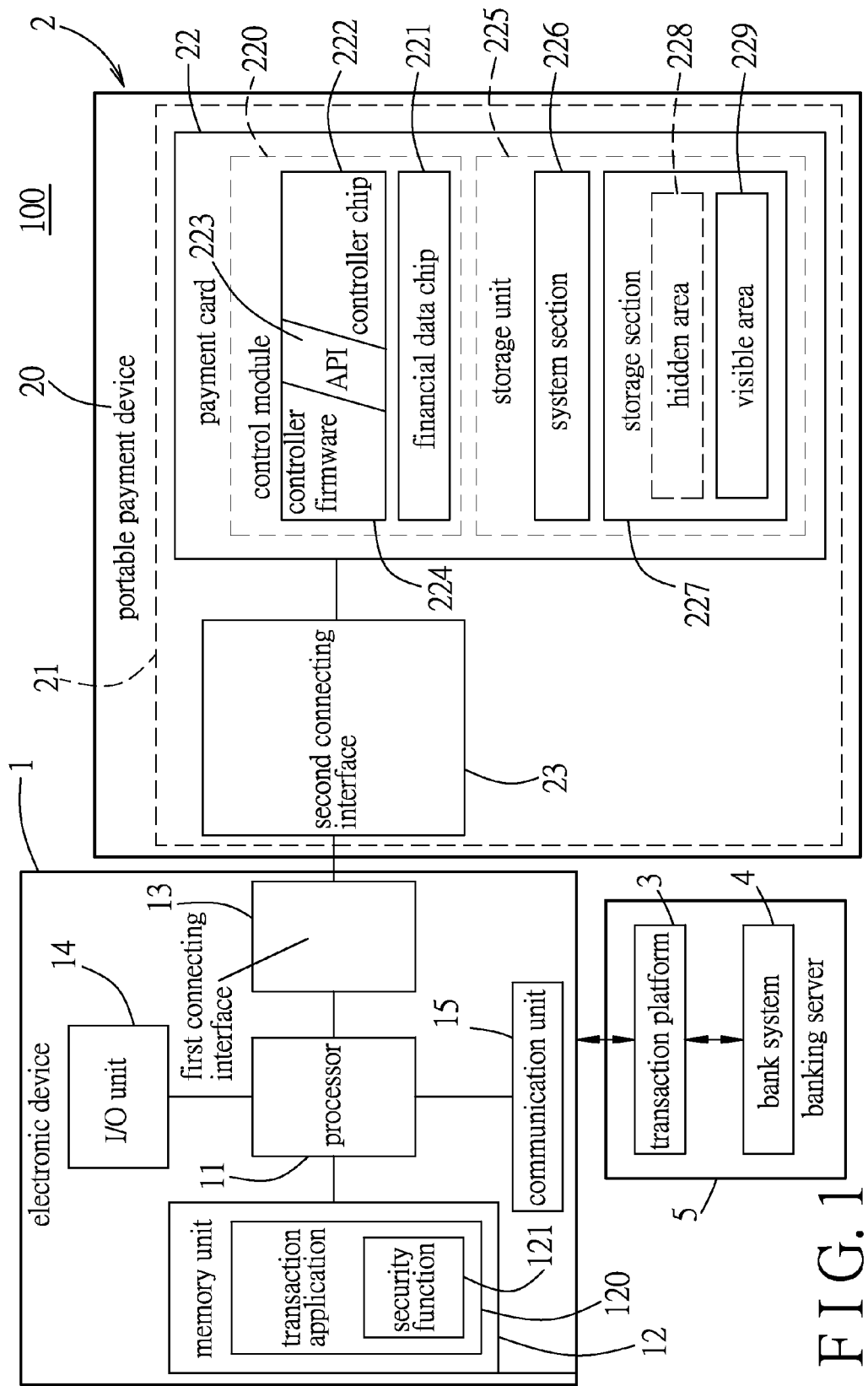
FIG. 1 is a block diagram of a preferred embodiment of a system according to the invention.

As shown in FIG. 1, the preferred embodiment of a system 100 according to the present invention is for implementing a method for processing a payment that is related to a transaction. The system 100 includes an electronic device 1 that is able to communicate with a banking server 5, and a portable payment device 2 that is provided with a payment card 22, that is to be removably connected to the electronic device 1, and that serves as an interface device for coupling the payment card 22 to the electronic device 1.

Figure 2:
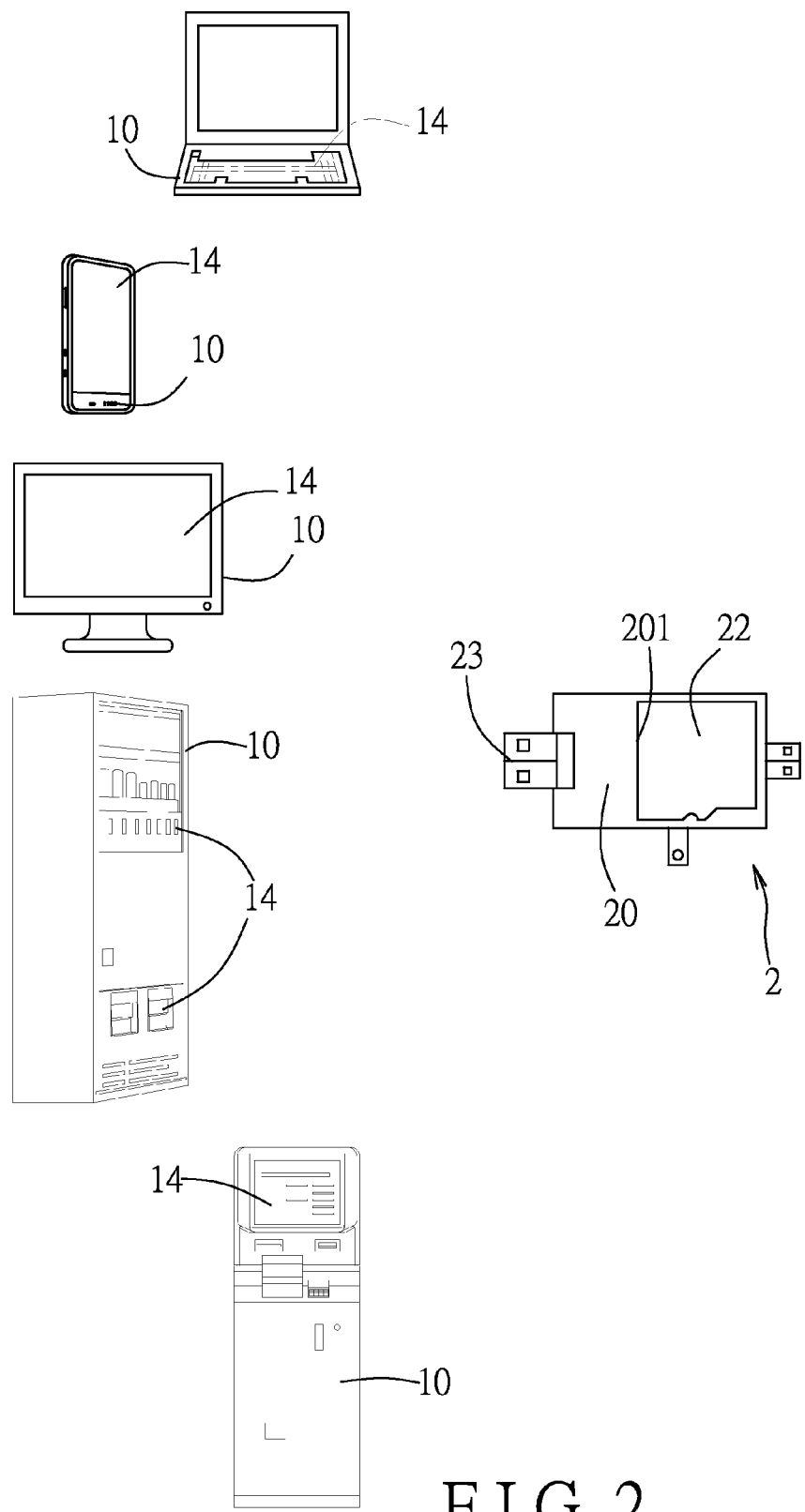
FIG. 2 is a schematic view of an interface device being configured to communicate with various electronic devices in the system of FIG. 1.

In this embodiment, the electronic device 1 may be embodied using one of a personal computer, a laptop computer, a tablet computer, a mobile device, an automated teller machine (ATM), and a vending machine (See FIG. 2). It is noted that the personal computer, the laptop computer, the tablet computer and the mobile device may be in either a customer or a merchant's possession. The electronic device 1 has to include network connectivity and mechanism for executing an application designed for causing the electronic device 1 to perform the method for processing the payment.

The electronic device 1 is operable to communicate, over a network, with a banking server 5. The banking server 5 may be operated by a master bank that issues payment cards to customers, or a member bank. In this embodiment, the banking server 5 includes a transaction platform 3 for communicating with the electronic device, and a bank system 4 that is coupled to the transaction platform 3. In various embodiments, the transaction platform 3 and the bank system 4 may be integrated as a single component (e.g., a server) or may be implemented as two separate components that communicate over a dedicated channel or session. In cases that the transaction platform 3 and the bank system 4 are implemented as separate components, the transaction platform 3 may be operated by a third party other then the bank.

The electronic device 1 includes a processor 11, a memory unit 12 that is coupled to the processor 11 and that stores a transaction application 120 therein, a first connecting interface 13 that is coupled to the processor 11, an input/output (I/O) unit 14 that is coupled to the processor 11, and a communication unit 15 that is coupled to the processor 11.

In this embodiment, the first connector 13 may be embodied using a universal serial bus (USB) 2.0, USB 3.0, MiniUSB or MicroUSB port. The I/O unit 14 may include, but is not limited to, a mouse/keyboard combination, a touch screen, a speaker/display combination, or a combination thereof. In cases that the electronic device 1 is embodied using a vending machine, the I/O unit 14 may include a plurality of physical/virtual buttons, a control panel, an item dispenser, or a combination thereof. In cases that the electronic device 1 is embodied using an automated teller machine (ATM), the I/O unit 14 may include a touch screen, a keyboard, and a cash dispensing equipment.

The portable payment device 2 is embodied using a plug-and-play device (e.g., a device having universal serial bus (USB) 2.0, USB 3.0, MiniUSB or MicroUSB connectivity). The portable payment device 2 is removably connected to the electronic device 1 for performing the method for processing the payment.

The portable payment device 2 may be adequately dimensioned to be fit into pockets or purses, and/or to be attached to other objects, such as the purse or a portable device, as an accessory item. The portable payment device 2 includes a housing 20 formed with a card slot 201, a circuit board 21 disposed in the housing 20, and a second connecting interface 23 disposed on the circuit board 21 and configured to be electrically connected to the first connecting interface 13 of the electronic device 1. The card slot 201 is provided with a card interface for containing the payment card 22 therein. The card interface provides a communication interface between the payment card 22 and the second connecting interface 23, and as a result, when the portable payment device 2 is coupled to the electronic device 1, access to the payment card is enabled using the electronic device 1. It is noted that the portable payment device 2 is not provided with computing functionality when the payment card 22 is not connected with the portable payment device 2.

In this embodiment, the payment card 22 is embodied using a micro Secure Digital (SD) card. The payment card 22 includes a control module 220, a financial data chip 221 and a storage unit 225. The financial data chip 221 is in compliance with the FISC II specification.

The control module 220 includes a controller chip 222, controller firmware 224 that is loaded in a read-only memory (ROM) (not shown in the drawings), and an application program interface (API) 223. The controller chip 222 and the ROM may be integrated using integrated circuit packaging, and may be juxtaposed with the storage unit 225.

When the portable payment device 2 is coupled to the electronic device 1, the processor 11 is operable to access the financial data chip 221 and the storage unit 225 through the controller firmware 224. The API 223 and the controller firmware 224 are able to operate according to the instructions of the transaction application 120. The API 223 includes functions that are able to perform encryptions using algorithms such as Triple Data Encryption Algorithm symmetric-key block cipher (3DES), Advanced Encryption Standard (AES), RSA encryption, etc.

The storage unit 225 includes a system section 226 and a storage section 227. The system section 226 is built in with basic operation information. The storage section 227 includes a hidden area 228 and a visible area 229. The visible area 229 allows access by an operating system (OS) of the electronic device 1. For example, for a Microsoft Windows® system, the visible area 229 may be accessed using a File Management program.

The hidden area 228 is not accessible to the OS, and it is not allowed to perform operations such as read, write or modify content of files stored in the hidden area 228 via the OS. Instead, the hidden area 228 is only accessible to the transaction application 120 via the controller firmware 224 after a certain authorization sequence has been done. Specifically, when the portable payment device 2 is coupled to the electronic device 1, the controller firmware 224 is configured to report to the OS that only the visible area 229 is detected. As a result, the OS will not display the hidden area 228 to a user. The hidden area 228 is accessible only when the user executes the transaction application 120, and passes the authorization sequence. Details regarding the authorization sequence are readily appreciated by those skilled in the art, and are thus omitted herein for the sake of brevity.

The hidden area 228 stores a virtual account that is associated with a bank account that is between a user of the portable payment device 2 and the bank that operates the banking server 5. Data regarding the bank account is stored in the financial data chip 221. In practice, the hidden area 228 may store a plurality of virtual accounts respectively associated with a plurality of bank accounts.

Figure 3A:
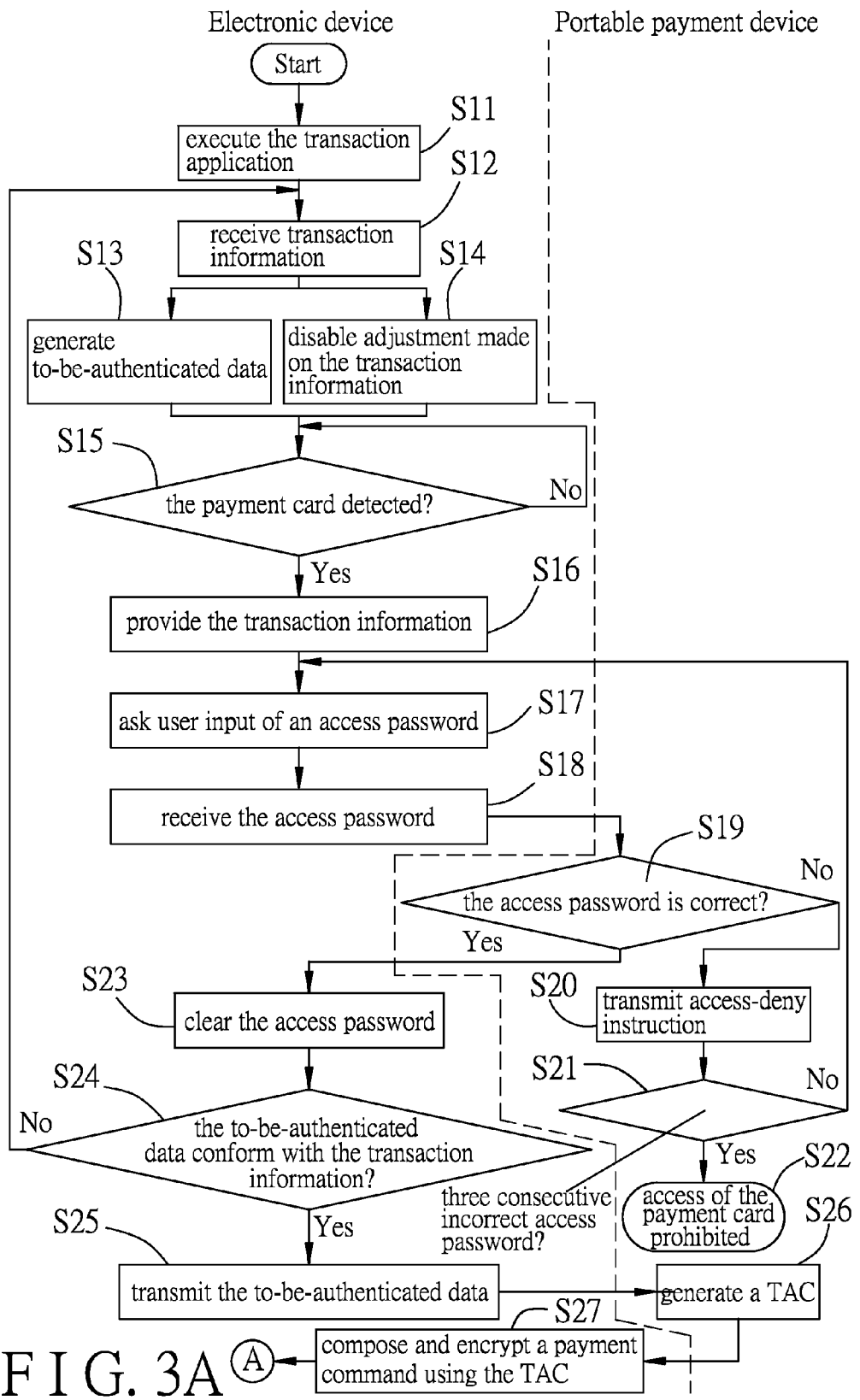
FIGS. 3A to 3C are flow charts illustrating steps of a method for processing a payment using the system of FIG. 1.

Further referring to FIG. 3A, the method for processing the payment will now be described. In the following example, the electronic device 1 may be embodied using a computer, and the transaction is purchase of a Taiwan High Speed Rail ticket.

To begin with, a user may operate the electronic device 1 to connect to a website that handles the ticket purchase (see FIG. 4). The website provides the user with an interface for inputting transaction information related to the transaction and to the payment for the transaction. Here, the transaction information includes details regarding the trip (e.g., information related to the user, departure time, place of departure, destination, train fare, etc.).

After the transaction information is provided by the user, the website provides a number of ways for the user to make the payment (e.g., paying in a convenient store or a railway station, using a conventional credit card or the payment card 22). Here, in this case, the user selects to make the payment using the payment card 22. In response, the processor 11 of the electronic device 1 is operable to execute the transaction application 120 (step S11).

In step 12, the processor 11 receives the transaction information. Afterward, the processor 11 executes a security function 121 included in the transaction application 120 to generate to-be-authenticated data in step S13, and to disable adjustment made on the transaction information in step S14. Specifically, the to-be-authenticated data includes the transaction information, and after step S14, it is not allowed for the user to make any change to the transaction information. It should be noted that steps S13 and S14 may be performed in any order, or performed simultaneously.

Then, the processor 11 generates an instruction for the user to connect the portable payment device 2 (provided with the payment card 22) to the electronic device 1 (see FIG. 5). When the processor 11 detects, in step S15, the payment card 22 through the portable payment device 2, the flow proceeds to step S16. Otherwise, the processor 11 idles by until the portable payment device 2 is connected.

In step S16, the processor 11 outputs, via the I/O unit 14, the transaction information again for the user to confirm, and provides a list of virtual accounts stored in the payment card 22 for the user to select from. Specifically, the payment card 22 initially stores a master virtual account associated with master bank, and may store additional member virtual accounts that are associated with various member banks.

After one of the virtual accounts is selected, in step S17, the processor 11 outputs an instruction that asks user input of an access password associated with the payment card 22 (see FIG. 6).

Upon receipt of the access password (step S18), the processor 11 subsequently transmits the access password to the payment card 22 through the first connecting interface 13 and the second connecting interface 23. The payment card 22 is operable to verify the access password in step S19. When it is verified by the payment card 22 that the access password is correct, the payment card 22 transmits an access-grant instruction to the electronic device 1, and the flow proceeds to step S23.

Otherwise, the flow proceeds to step S20, in which the payment card 22 transmits an access-deny instruction to the electronic device 1, and in step S21, the payment card 22 counts a number of consecutive occasions that a wrong access password is received. When the number is smaller than a threshold (for example, three), the flow goes back to step S17 for allowing the user to enter another access password. Otherwise, the flow proceeds to step S22, in which the payment card 22 is locked and access of the payment card 22 is prohibited.

In step S23, the electronic device 1 clears the access password that is temporarily stored therein (received in step S18). This step is implemented to prevent the access password from being retrieved by other parties. This is even more important in the cases where a public electronic device, or an electronic device in the merchant's possession is used for performing the method.

In step S24, the processor 11 is operable to compare the to-be-authenticated data generated in step S13 and the transaction information confirmed by the user in step S16. When it is determined that the to-be-authenticated data conforms with the transaction information, the flow proceeds to step S25. Otherwise, the flow goes back to step S12.

In step S25, the processor 11 transmits the to-be-authenticated data to the payment card 22. Then, in step S26, the payment card 22 is configured to generate a transaction authentication code (TAC) based on the to-be-authenticated data and a secret key, and to transmit the TAC to the electronic device 1.

Specifically, the payment card 22 stores, in the financial data chip 221, a master secret key corresponding to the master virtual account. The payment card 22 may store, in the hidden area 228, additional member secret keys corresponding to the member virtual accounts. As such, the payment card 22 selects a corresponding one of the secret keys (including the master secret key and the member secret keys) based on the virtual account selected in step S16 for generating the TAC.

In step S27, the processor 11 executing the transaction software 120 composes a payment command using the TAC. The payment command includes at least the transaction information and the TAC, and is encrypted.

Figure 3B:
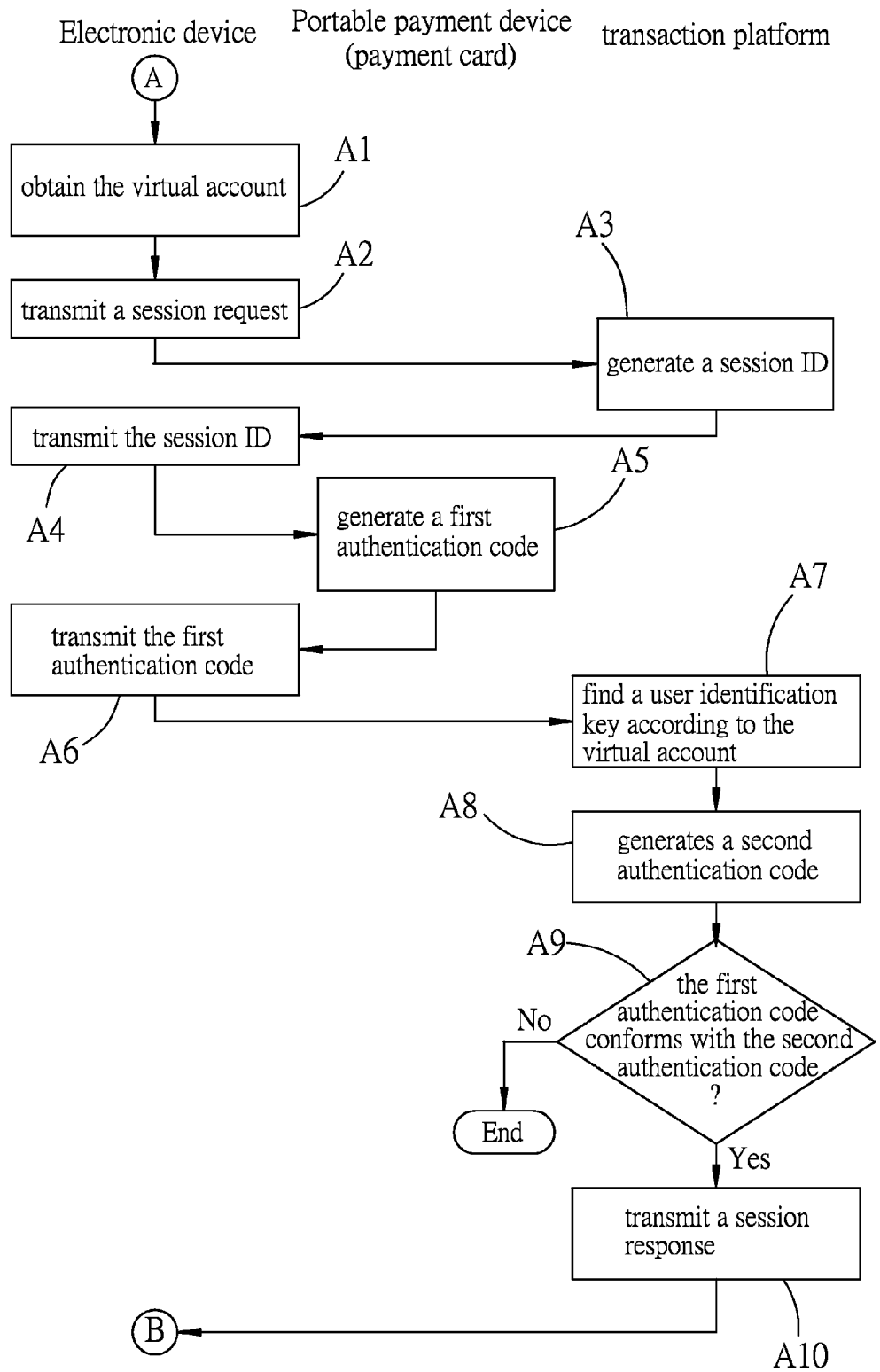

Referring to FIG. 3B, after step S27, the electronic device 1 attempts to establish a session with the transaction platform 3. The session is for providing a secure communication channel between the electronic device 1 and the transaction platform 3, and for identifying validity of the payment card 22.

In step A1, the processor 11 executing the transaction software 120 obtains the virtual account used in step S16 from the payment card 22. It is noted in that in other embodiments, various codes or symbols that are able to identify the user of the portable payment device 2 may be employed.

In step A2, the processor 11 transmits a session request to the transaction platform 3. The session request includes the virtual account.

In step A3, the transaction platform 3 generates a session identification (ID) in response to receipt of the session request, and transmits the session ID to the electronic device 1. The electronic device 1 in turn receives the session ID and transmits the same to the payment card 22 in step A4.

In step A5, the payment card 22 is operable to generate a first authentication code based on the session ID and a card identification key that is stored in the hidden area 228 during physical production of the payment card 22. Then, the payment card 22 transmits the first authentication code to the electronic device 1.

It is noted that the card identification key is only known to the payment card 22 and the transaction platform 3, and is not transmitted to the electronic device 1 throughout the method. Furthermore, generation of the first authentication code is done within the payment card 22. This ensures that the electronic device 1 is not able to intervene in the generation of the first authentication code, and would not be able to generate a valid first authentication code without the card identification key. Therefore, only a valid payment card 22 is able to generate a valid first authentication code.

The electronic device 1 in turn transmits the first authentication code to the transaction platform 3 in step A6.

Then, in step A7, the transaction platform 3 finds a user identification key stored therein, according to the virtual account included in the session request that is received from the electronic device 1 in step A2. The user identification key corresponds to the card identification key, and is dedicated to the virtual account.

In step A8, the transaction platform 3 generates a second authentication code based on the session ID generated in step A3 and the user identification key found in step A7.

In step A9, the transaction platform 3 determines whether the first authentication code received from the electronic device 1 in step A6 conforms with the second authentication code generated in step A8. When it is determined that the first authentication code conforms with the second authentication code (that is, the payment card 22 is one issued by the bank), the flow proceeds to step A10. Otherwise, the transaction platform 3 determines that the payment card 22 failed to generate a valid first authentication code (and therefore may not be one issued by the bank), and the flow is terminated.

In step A10, the transaction platform 3 transmits a session response to the electronic device 1 so as to establish the session and to allow the transaction to proceed.

Figure 3C:
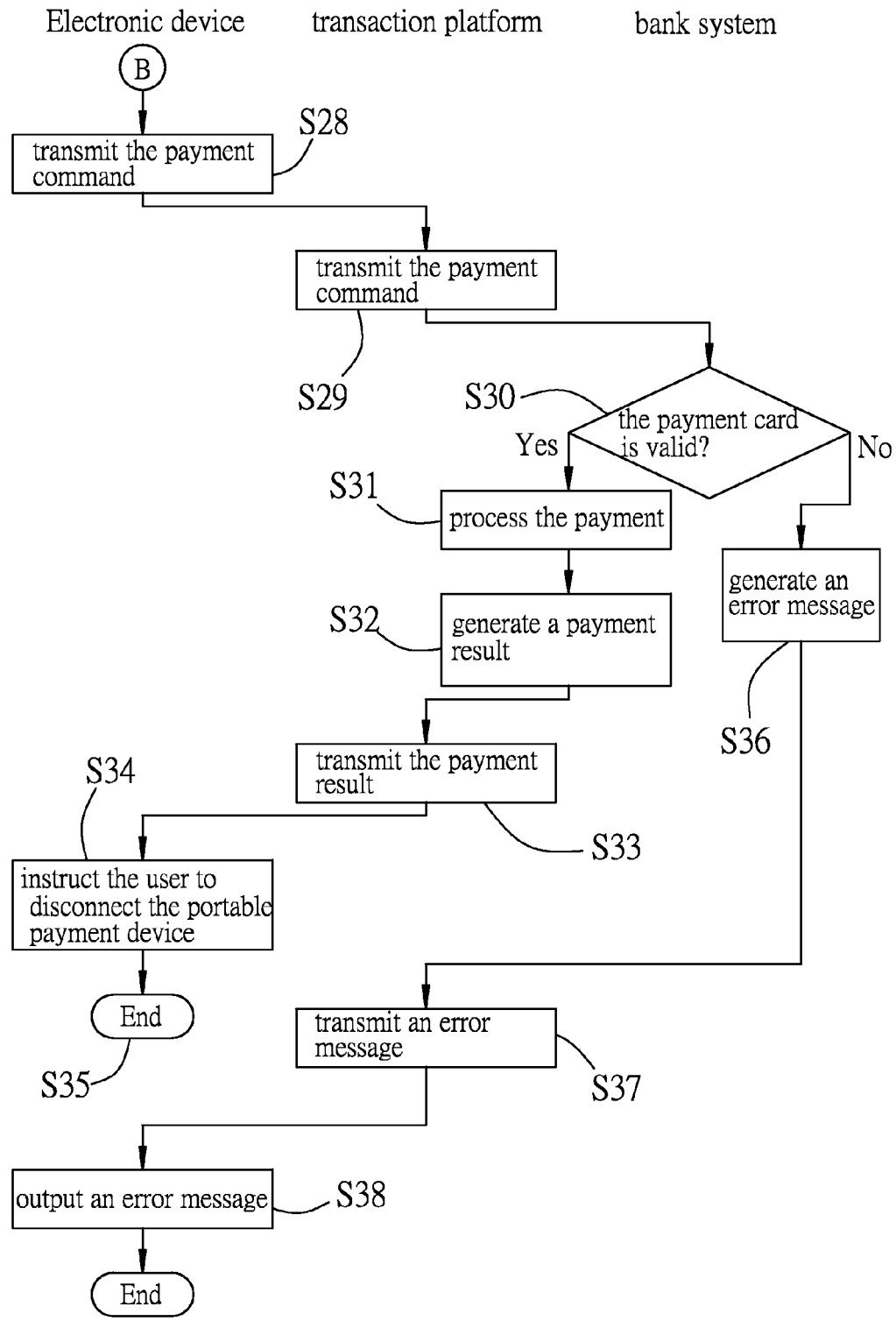
Figure 7:

Referring to FIG. 3C, after the transaction platform 3 allows the transaction to proceed, in step S28, the payment command composed in step S27 is transmitted by the processor 11, via the communication unit 15, to the transaction platform 3 under the session. Specifically, the transmission is executed using Secured Sockets Layer (SSL) protocol. The transaction platform 3 in turn transmits the payment command to the bank system 4 in step S29 through the dedicated channel.

In response to receipt of the payment command, in step S30, the bank system 4 is operable to decrypt the received payment command, and to identify validity of the payment card 22 based on the payment command. Specifically, the bank system 4 generates a confirmation code using the to-be-authenticated data included in the payment command, using the same secret key stored in the payment card 22 (e.g., in the financial data chip 221 or the hidden area 228). In some embodiments, the secret key for generating the confirmation code may be included in the payment command, and transmitted by the transaction platform 3 to the bank system 4.

The bank system 4 then compares the TAC and the confirmation code. When it is determined that the confirmation code conforms with the TAC, the bank system 4 determines that the payment card 22 is valid, and the transaction information is not altered during transmission. The flow then proceeds to step S31. Otherwise, the flow proceeds to step S36.

In step S31, the bank system 4 is configured to process the payment according to the transaction information included in the payment command. In this case, a value of the train fare (in this case, NT$160) is deducted from the bank account that is represented by the virtual account, and is transferred to an account owned by the Taiwan High Speed Rail company.

Then, in step S32, the bank system 4 generates a payment result indicating that the transaction has been processed, and transmits the payment result to the transaction platform 3.

In turn, the payment result is relayed to the electronic device 1 in step S33. The transmission of the payment result is similarly under the session and uses the SSL protocol. Afterward, in step S34, the electronic device 1 may output an alert to instruct the user to disconnect the portable payment device 2.

The payment result may include a credential that is provided to the user in step S35. The credential may be in the form of a quick response (QR) code or a string of codes for the user to use in a convenience store or a station to redeem a physical train ticket, or in the form of an electronic train ticket that can be directly used in a station when downloaded to a mobile device.

In step S30, when it is determined that the confirmation code does not conform with the TAC, the bank system 4 determines that either the payment card 22 is invalid, or the transaction information was altered during transmission. As a result, in step S36, the bank system 4 generates and transmits an error message to the transaction platform 3. In step S37, the transaction platform 3 relays the error message to the electronic device 1, which outputs the error message in step S38. As a result, the transaction will not be processed.

The above-described method may be adopted in places such as a retail store. In such cases, when a customer is to purchase goods and/or services, a merchant may operate the electronic device 1 (e.g., a personal computer) to execute the transaction application 120 (step S11). In step S12, the transaction information may be inputted to the electronic device 1 by, for example, scanning a barcode associated with the goods and/or services. Then, the customer provides the merchant with the portable payment device 2 having the payment card 22 in step S15, confirms the transaction information in step S16, and provides the electronic device 1 with the access password in step S17.

The electronic device 1 will automatically carry out the subsequent steps with the transaction platform 3 and the bank system 4. Afterwards, in step S34, the payment is processed, and the customer may retrieve the portable payment device 2 and obtain the goods/services.

To sum up, the method of the present invention does not require a merchant to provide specific processing equipments for use with the conventional credit cards. Since the portable payment device 2 is embodied using a plug-and-play device, an arbitrary electronic device having the first connecting interface 13 and installed with the transaction application 120 can be employed as the electronic device 1. As a result, the method is beneficial for expanding usage of the payment card 22 in cases where the conventional credit card is not applicable.

For example, the method is applicable in cases where the goods/services are provided to the customer via delivery, and the payment is made after the goods/services have been delivered. A delivery personnel may bring along an electronic device 1 having the first connecting interface 13 and installed with the transaction application 120, and after the customer confirms the goods/services, operate the electronic device 1 to perform the method. As a result, the delivery personnel is not required to being cash during the trip.

The method is also applicable in cases where the goods/services are provided to the customer by a vending machine. After the payment is carried out in step S35, the vending machine provides the goods.

Further, the portable payment device 2 may be configured to be used with an ATM machine for withdrawing cash from the back account. In such cases, after the method is carried out, the ATM dispenses the cash to the customer.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for implemented using a system that includes an electronic device, and a banking server and a payment card, the payment card including a controller chip, said method comprising:
   (a) receiving, by the electronic device, transaction information related to a transaction and to a payment for the transaction;
   (b) accessing, by the electronic device, the payment card via a portable payment device which is a plug-and-play device;
   (c) generating, by the electronic device cooperating with the payment card, a payment command that includes at least the transaction information;
   (d) establishing, by the electronic device cooperating with the payment card and the banking server, a session with the banking server, the session providing a secure communication channel between the electronic device and the banking server;
   (e) transmitting, by the electronic device, the payment command to the banking server under the session established in step (d);
   (f) identifying, by the banking server, validity of the payment card based on the payment command in response to receipt of the payment command;
   (g) processing, by the banking server, the payment according to the transaction information included in the payment command after identifying the payment card as valid;
   (h) generating, by the banking server, a payment result after processing the payment; and
   (i) receiving, by the electronic device, the payment result from the banking server under the session established in step (d);
   wherein step (d) further comprises sub-steps of:
   (d1) obtaining, by the electronic device from the payment card, a virtual account associated with a bank account that is between a user of the portable payment device and a bank that operates the banking server and that is used for the payment;
   (d2) transmitting, by the electronic device to the banking server, a session request that includes the virtual account;
   (d3) generating, by the banking server, a session identification (ID) in response to receipt of the session request;
   (d4) transmitting, by the banking server to the electronic device, the session ID;
   (d5) transmitting, by the electronic device to the payment card, the session ID;
   (d6) generating, by the payment card, a first authentication code based on the session ID and a card identification key stored therein;
   (d7) transmitting, by the payment card to the electronic device, the first authentication code;
   (d8) transmitting, by the electronic device to the banking server, the first authentication code;
   (d9) finding, by the banking server, a user identification key stored therein according to the virtual account included in the session request that is transmitted by the electronic device in sub-step (d2), the user identification key corresponding to the card identification key and being dedicated to the virtual account;
   (d10) generating, by the banking server, a second authentication code based on the session ID generated in sub-step (d3) and the user identification key found in sub-step (d9);
   (d11) determining, by the banking server, whether the first authentication code transmitted by the electronic device in sub-step (d8) conforms with the second authentication code generated in sub-step (d10); and
   (d12) transmitting, by the banking server to the electronic device, a session response upon determining in sub-step (d11) that the first authentication code conforms with the second authentication code; and
   wherein the establishing of the session in step (d) is performed in accordance with the session response.

2. The method of claim 1, wherein step (c) further comprises sub-steps of:
   (c1) transmitting, by the electronic device to the payment card, to-be-authenticated data that includes the transaction information;
   (c2) generating, by the payment card, a transaction authentication code (TAC) based on the to-be-authenticated data and to transmit the TAC to the electronic device; and
   (c3) composing, by the electronic device, the payment command using the TAC.

3. The method of claim 2, wherein:
   the TAC generated by the payment card includes a secret key stored therein; and
   step (f) further comprises sub-steps of:
   (f1) generating, by the banking server, a confirmation code using the to-be-authenticated data included in the payment command using the same secret key; and
   (f2) comparing, by the banking server, the TAC and the confirmation code.

4. The method of claim 1, wherein step (b) further comprises sub-steps of:
   (b1) when the portable payment device is connected to the electronic device, determining, by the electronic device, whether the payment card is detected;
   (b2) in response to the determination that the payment card is detected, outputting, by the electronic device, an instruction to ask user input of an access password;
   (b3) upon receipt of the access password, temporarily storing, within the electronic device, the access password;
   (b4) transmitting, by the electronic device, the access password to the payment card;
   (b5) verifying, by the payment card, the access password;
   (b6) transmitting, by the payment card, an access-grant instruction to the electronic device when the access password is correct; and
   (b7) upon receipt of the access-grant instruction, clearing, by the electronic device, the access password temporarily stored therein.

5. The method of claim 1, further comprising, after step (a), the step of disabling adjustment made on the transaction information.

6. A system comprising:
   a banking server,
   a payment card that includes a controller chip;
   an electronic device that includes
      a processor,
      a memory unit coupled to said processor and storing a transaction application therein,
      a first connecting interface coupled to said processor, and
      a communication unit coupled to said processor and configured to communicate with said banking server; and
   a portable payment device that is a plug-and-play device, that is to be removably connected to said electronic device, and that includes
      a card slot provided with a card interface for containing a payment card therein, and
      a second connecting interface to be electrically connected to said first connecting interface of said electronic device, thereby enabling access to the payment card using said electronic device;
   wherein said processor, upon execution of said transaction application, causes said electronic device to cooperate with the payment card and said banking server to execute steps comprising:
      (a) receiving, by the electronic device, transaction information related to a transaction and to a payment for the transaction;
      (b) accessing, by the electronic device, the payment card via a portable payment device which is a plug-and-play device;
      (c) generating, by the electronic device cooperating with the payment card, a payment command that includes at least the transaction information;
      (d) establishing, by the electronic device cooperating with the payment card and the banking server, a session with the banking server, the session providing a secure communication channel between the electronic device and the banking server;
      (e) transmitting, by the electronic device, the payment command to the banking server under the session established in step (d);
      (f) identifying, by the banking server, validity of the payment card based on the payment command in response to receipt of the payment command;
      (g) processing, by the banking server, the payment according to the transaction information included in the payment command after identifying the payment card as valid;
      (h) generating, by the banking server, a payment result after processing the payment; and
      (i) receiving, by the electronic device, the payment result from the banking server under the session established in step (d);
   wherein step (d) further comprises sub-steps of:
      (d1) obtaining, by the electronic device from the payment card, a virtual account associated with a bank account that is between a user of the portable payment device and a bank that operates the banking server and that is used for the payment;
      (d2) transmitting, by the electronic device to the banking server, a session request that includes the virtual account;
      (d3) generating, by the banking server, a session identification (ID) in response to receipt of the session request;
      (d4) transmitting, by the banking server to the electronic device, the session ID;
      (d5) transmitting, by the electronic device to the payment card, the session ID;
      (d6) generating, by the payment card, a first authentication code based on the session ID and a card identification key stored therein;
      (d7) transmitting, by the payment card to the electronic device, the first authentication code;
      (d8) transmitting, by the electronic device to the banking server, the first authentication code;
      (d9) finding, by the banking server, a user identification key stored therein according to the virtual account included in the session request that is transmitted by the electronic device in sub-step (d2), the user identification key corresponding to the card identification key and being dedicated to the virtual account;
      (d10) generating, by the banking server, a second authentication code based on the session ID generated in sub-step (d3) and the user identification key found in sub-step (d9);
      (d11) determining, by the banking server, whether the first authentication code transmitted by the electronic device in sub-step (d8) conforms with the second authentication code generated in sub-step (d10); and
      (d12) transmitting, by the banking server to the electronic device, a session response upon determining in sub-step (d11) that the first authentication code conforms with the second authentication code; and
   wherein the establishing of the session in step (d) is performed in accordance with the session response.

7. The system of claim 6, wherein said electronic device is an automated teller machine (ATM), and further includes an input/output (I/O) unit including at least a cash dispensing equipment.

8. The system of claim 6, wherein said electronic device is a vending machine, and further includes an input/output (I/O) unit including at least a plurality of physical/virtual buttons, and an item dispenser.

* * * * *